United States Patent
Loehr et al.

(10) Patent No.: US 12,089,228 B2
(45) Date of Patent: *Sep. 10, 2024

(54) MULTIPLE RADIO ACCESS TECHNOLOGY COMMUNICATIONS

(71) Applicant: Lenovo (Singapore) Pte. Ltd., New Tech Park (SG)

(72) Inventors: Joachim Loehr, Wiesbaden (DE); Prateek Basu Mallick, Dreieich (DE); Karthikeyan Ganesan, Kronberg im Taunus (DE); Ravi Kuchibhotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,678

(22) Filed: Nov. 9, 2022

(65) Prior Publication Data

US 2023/0064336 A1 Mar. 2, 2023

Related U.S. Application Data

(63) Continuation of application No. 16/837,405, filed on Apr. 1, 2020, now Pat. No. 11,523,378.

(60) Provisional application No. 62/827,698, filed on Apr. 1, 2019.

(51) Int. Cl.
*H04W 72/23* (2023.01)
(52) U.S. Cl.
CPC .................................. *H04W 72/23* (2023.01)
(58) Field of Classification Search
CPC ........ H04W 4/40; H04W 72/23; H04W 88/06
See application file for complete search history.

(56) References Cited

U.S. PATENT DOCUMENTS

| 2016/0044619 A1 | 2/2016 | Ryu et al. |
| 2017/0019886 A1 | 1/2017 | Patel et al. |
| 2017/0086176 A1* | 3/2017 | Seo ..................... H04W 56/002 |

(Continued)

FOREIGN PATENT DOCUMENTS

WO 2019022480 A1 1/2019

OTHER PUBLICATIONS

Huwaei, Hisilicon, "Potential RAN2 Impacts on gNB scheduled resource allocation for NR V2X", 3GPP TSG-RAN WG#2 #104 R2-1816518, Nov. 12-16, 2018, pp. 1-3.

(Continued)

*Primary Examiner* — Chi Ho A Lee
(74) *Attorney, Agent, or Firm* — Kunzler Bean & Adamson

(57) ABSTRACT

Apparatuses, methods, and systems are disclosed for multiple radio access technology communications. One method includes receiving control information at a device on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used in the device to determine a time to apply the sidelink resource allocation for the second radio access technology.

20 Claims, 10 Drawing Sheets

(56) References Cited

U.S. PATENT DOCUMENTS

| | | | |
|---|---|---|---|
| 2017/0289733 A1* | 10/2017 | Rajagopal | H04L 5/0082 |
| 2018/0048994 A1* | 2/2018 | Kwon | H04W 4/021 |
| 2018/0070264 A1 | 3/2018 | Saiwai et al. | |
| 2018/0359735 A1 | 12/2018 | Lee et al. | |
| 2019/0149365 A1 | 5/2019 | Chatterjee et al. | |
| 2019/0274121 A1 | 9/2019 | Wu et al. | |
| 2020/0053835 A1* | 2/2020 | Ye | H04L 1/08 |
| 2020/0146082 A1 | 5/2020 | Chen et al. | |
| 2020/0229145 A1 | 7/2020 | Kang et al. | |
| 2020/0275450 A1 | 8/2020 | Lee et al. | |
| 2020/0305167 A1* | 9/2020 | Freda | H04W 72/1263 |
| 2020/0314612 A1* | 10/2020 | Kang | H04W 4/70 |
| 2020/0314928 A1 | 10/2020 | Kang et al. | |
| 2021/0051692 A1* | 2/2021 | Chen | H04W 72/56 |
| 2021/0212081 A1 | 7/2021 | Lin | |
| 2021/0258853 A1 | 8/2021 | Wang et al. | |
| 2021/0274452 A1 | 9/2021 | Khoryaev et al. | |
| 2022/0038985 A1* | 2/2022 | Deenoo | H04W 36/32 |
| 2022/0174774 A1* | 6/2022 | Tseng | H04W 76/23 |

OTHER PUBLICATIONS

3GPP, "3rd Generation Partnership Project; Technical Specification Group Services and System Aspects; Study on enhancement of 3GPP Support for 5G V2X Services", 3GPP TR 22.886 V16.2.0, Dec. 2018, pp. 1-76.

3GPP, "3rd Generation Partnership Project; Technical Specification Group Radio Access Network; NR; Study on NR Vehicle-to-Everything (V2X)", 3GPP TR 38.885 V16.0.0, Mar. 2019, pp. 1-122.

* cited by examiner

MULTIPLE RADIO ACCESS TECHNOLOGY COMMUNICATIONS

CROSS-REFERENCE TO RELATED APPLICATIONS

This application is a continuation of U.S. application Ser. No. 16/837,405 filed on Apr. 1, 2020, which claims priority to U.S. Patent Application Ser. No. 62/827,698 entitled "APPARATUSES, METHODS, AND SYSTEMS FOR CROSS-RAT V2X COMMUNICATION" and filed on Apr. 1, 2019 for Joachim Loehr, all of which are incorporated herein by reference in their entirety.

FIELD

The subject matter disclosed herein relates generally to wireless communications and more particularly relates to multiple radio access technology communications.

BACKGROUND

The following abbreviations are herewith defined, at least some of which are referred to within the following description: Third Generation Partnership Project ("3GPP"), $5^{th}$ Generation ("5G"), QoS for NR V2X Communication ("5QI/PQI"), Authentication, Authorization, and Accounting ("AAA"), Positive-Acknowledgment ("ACK"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Access Stratum ("AS"), Authentication Server Function ("AUSF"), Authentication Token ("AUTN"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFT 5"), Downlink Control Information ("DCI"), Downlink ("DL"), Demodulation Reference Signal ("DMRS"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Local Area Network ("LAN"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Minimum Communication Range ("MCR"), Modulation Coding Scheme ("MCS"), Master Information Block ("MIB"), Multiple Input Multiple Output ("MIMO"), Mobility Management ("MM"), Mobility Management Entity ("MIME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NS SF"), Network Slice Selection Policy ("NS SP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Primary Cell ("PCell"), Policy Control Function ("PCF"), Physical Cell Identity ("PCP"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TM"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, multiple RATs may be used.

BRIEF SUMMARY

Methods for multiple radio access technology communications are disclosed. Apparatuses and systems also perform the functions of the methods. One embodiment of a method includes receiving control information at a device on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used in the device to determine a time to apply the sidelink resource allocation for the second radio access technology.

One apparatus for multiple radio access technology communications includes a receiver that receives control information on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used to determine a time to apply the sidelink resource allocation for the second radio access technology.

Another embodiment of a method for multiple radio access technology communications includes transmitting control information to a device on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used in the device to determine a time to apply the sidelink resource allocation for the second radio access technology.

Another apparatus for multiple radio access technology communications includes a transmitter that transmits control information to a device on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used in the device to determine a time to apply the sidelink resource allocation for the second radio access technology.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
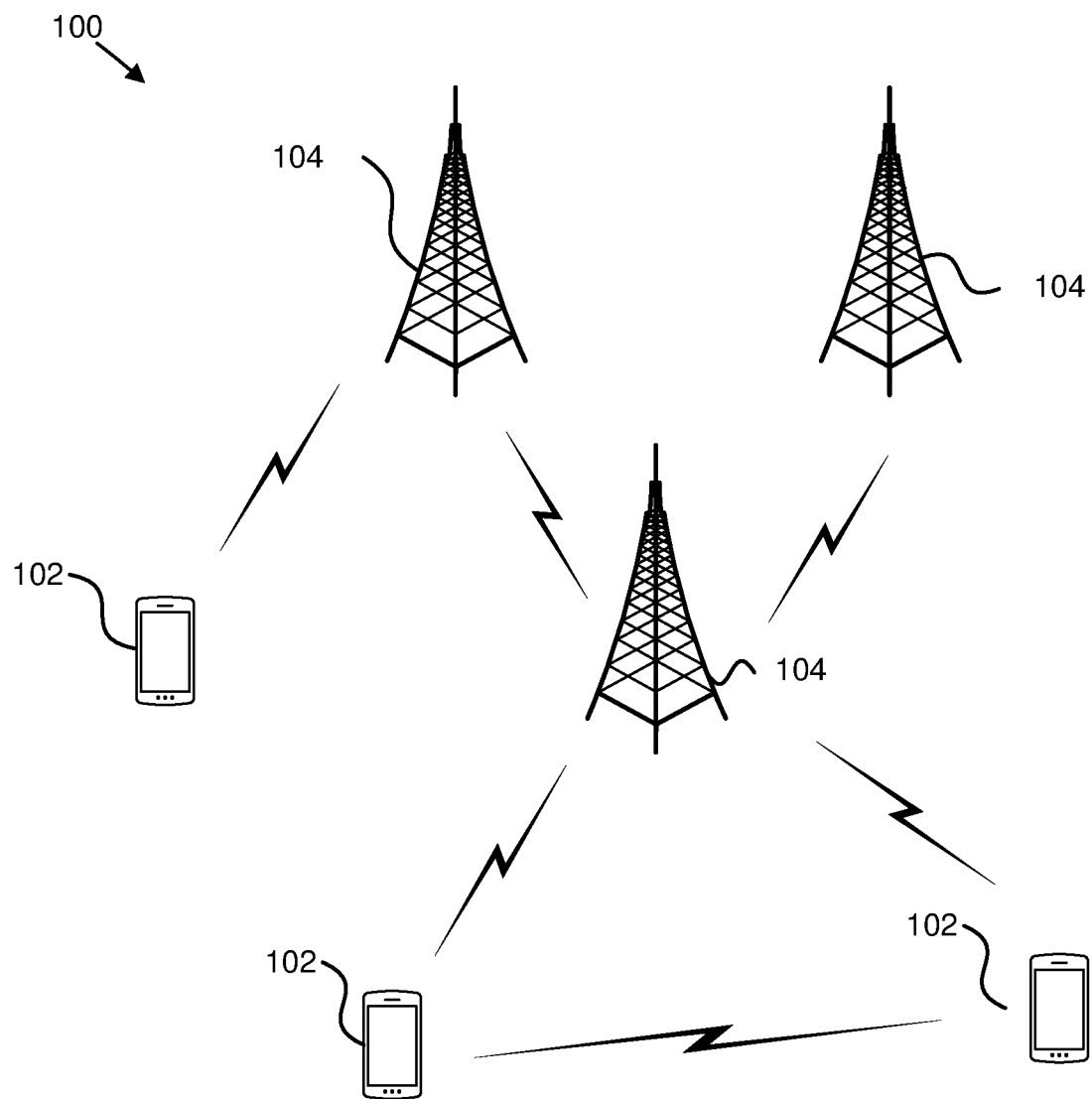
FIG. 1 is a schematic block diagram illustrating one embodiment of a wireless communication system for multiple radio access technology communications.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for multiple radio access technology communications. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive control information on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used to determine a time to apply the sidelink resource allocation for the second radio access technology. Accordingly, the remote unit 102 may be used for multiple radio access technology communications.

In some embodiments, a network unit 104 may transmit control information to a device on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used in the device to determine a time to apply the sidelink resource allocation for the second radio access technology. Accordingly, the network unit 104 may be used for multiple radio access technology communications.

Figure 2:
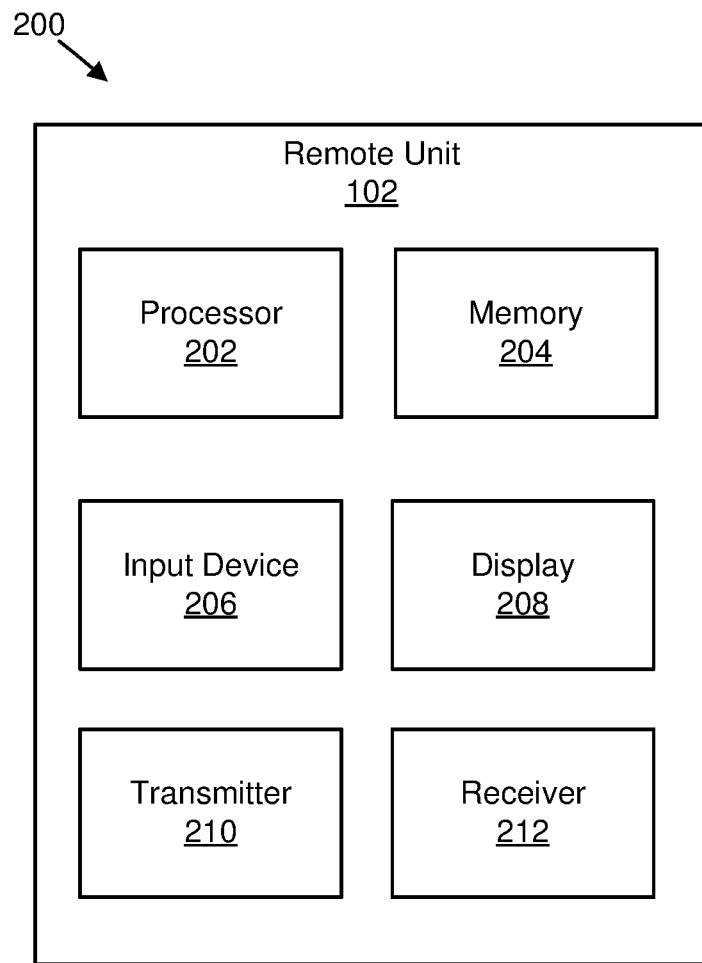
FIG. 2 is a schematic block diagram illustrating one embodiment of an apparatus that may be used for multiple radio access technology communications.

FIG. 2 depicts one embodiment of an apparatus 200 that may be used for multiple radio access technology communications. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212 may receive control information on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used to determine a time to apply the sidelink resource allocation for the second radio access technology.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
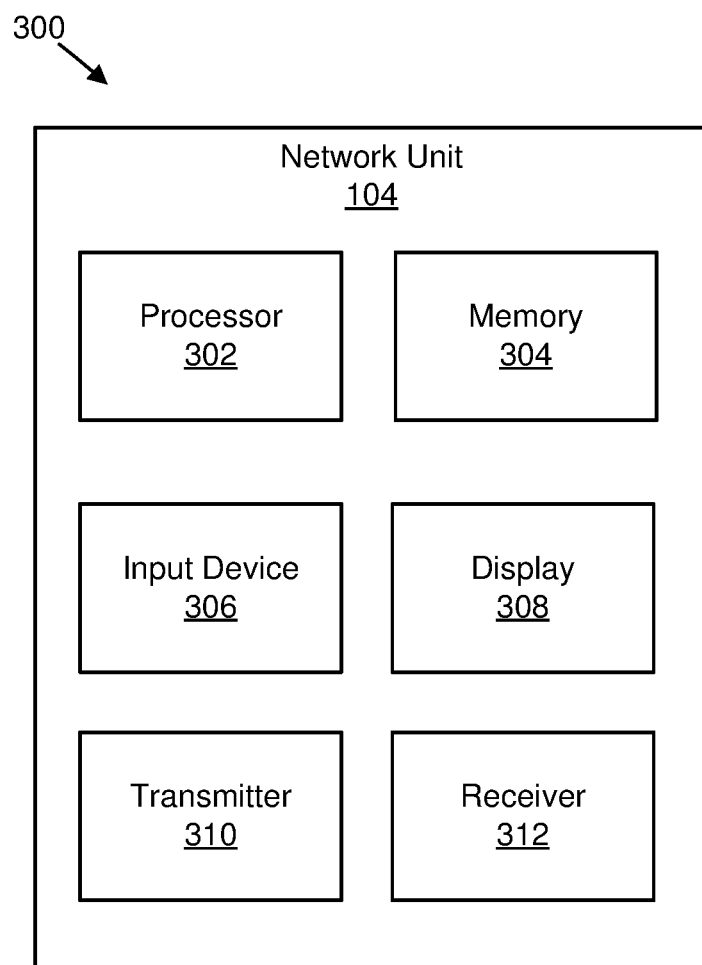
FIG. 3 is a schematic block diagram illustrating one embodiment of an apparatus that may be used for multiple radio access technology communications.

FIG. 3 depicts one embodiment of an apparatus 300 that may be used for multiple radio access technology communications. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 may transmit control information to a device on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used in the device to determine a time to apply the sidelink resource allocation for the second radio access technology.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various embodiments, two resource allocation modes may be used for NR and LTE V2X communications. In such embodiments, the two resource allocation modes for LTE may be referred to as Mode 3 and Mode 4; and for NR may be referred as Mode 1 and Mode 2. These different modes support direct V2X communications but differ on how they allocate radio resources. In certain modes, the cellular network allocates resources (e.g., a gNB allocates Mode-1 resources and an eNB allocates Mode-3 resources). In various modes (e.g., Mode-2 and Mode-4), cellular coverage is not required, and vehicles autonomously select their radio resources using a distributed scheduling scheme supported by congestion control mechanisms from pre-configured resource pools. In some embodiments, a RAN for in-coverage may can also allocate Mode-2 and Mode-4 resources. In certain embodiments, Mode-2 and/or Mode 4 are considered baseline modes and represents an alternative to 802.11p or DSRC.

In certain embodiments, all resource allocation modes have been designed to satisfy latency requirements and/or accommodate high Doppler spreads and high density of vehicles for V2X communications. In some embodiments, Mode-1 and Mode-3 may use a centralized RAN (e.g., gNB/eNB) scheduler. In various embodiments, a vehicular UE and RAN may use a Uu interface to communicate (e.g., sending BSR/SR from a transmitting V2X UE to the RAN and receiving, in response, a SL grant on PDCCH (e.g., DCI)). In certain embodiments, Mode-2 and Mode-4 may use a PC5 interface to facilitate direct LTE SL communications between two vehicular UEs. In such embodiments, distributed UE scheduling may be used. In some embodiments, V2X Mode-2 and Mode-4 may operate without infrastructure support even if the UEs are in RAN coverage. In various embodiments, resources may be shared with a Uu uplink. In certain embodiments, such as in LTE V2X, only broadcast type transmission may be supported, while in other embodiments, such as in NR based V2X, unicast and groupcast transmissions may be supported.

In some embodiments, operators may see a benefit in using available LTE coverage to control NR PC5 using a network scheduled mode of operation. In other embodiments, the NR (e.g., gNB) controlling LTE PC5 may be used for network scheduled and/or UE autonomous mode of operations.

In various embodiments, with dynamic cross-RAT scheduling, a DCI received on one RAT may indicate SL resource allocation for another RAT. Accordingly, new DCI formats may be used. In certain embodiments, because timing (e.g., slot and/or frame boundaries) of an NR cell and an LTE cell/carrier may differ significantly (e.g., asynchronous network operation) and/or the LTE operates on a TTI level (e.g., potentially having a different SCS than the NR cell and/or a BWP) while NR PHY operates on slot-level or OFM-symbol level, DCI received on one RAT may need to be delivered to another RAT at some predefined timing (e.g., some timing translation from one RAT to the other may be used).

As may be appreciated, eNB and/or gNB may be used for a base station but may be replaceable by any other radio access node (e.g., BS, eNB, gNB, AP, NR, etc.). Moreover, while various embodiments herein are described in the context of 5G NR, the embodiments may be equally applicable to other mobile communication systems supporting serving cells/carriers, such as systems configured for SL communication over a PC5 interface.

In a first embodiment, such as if NR Uu (e.g., a gNB) provides SL resources (e.g., SPS resources) for LTE SL UE mode 3 operations, a new DCI format may be introduced for NR Uu. The new DCI format may contain SL resource allocation information for an LTE PC5 interface. Moreover, the new DCI format may include DCI indicating activation and/or deactivation of a SL SPS configuration (e.g., SPS configuration may be signaled via RRC signaling) and/or may dynamically assign SL resources on the PC5 interface. In one implementation of the first embodiment, the new NR DCI format may have the same fields as an LTE DCI format allocating SL resources (e.g., DCI format 5_A). Such an implementation may enable the new NR DCI format to be understood by an LTE protocol stack of a NR V2X UE. In another implementation of the first embodiment, the new NR DCI format may be received on PDCCH assigning resources for the LTE PC5 interface (LTE V2X) and may contain an indicator (e.g., one-bit flag) indicating that the information fields contained within the DCI are to be applied to the LTE PC5 interface. In a further implementation of the first embodiment, a new RNTI may be used to indicate that a DCI conveys SL resource allocation information for another RAT, e.g., CRC of the DCI is scrambled with the new RNTI. According to one implementation of the first embodiment, a PHY layer of an NR protocol stack of a NR V2X UE may deliver a received NR DCI (e.g., on PDCCH) to an LTE PHY of an LTE protocol stack if a flag within received DCI indicates that the DCI assigns SL resources for the LTE PC5 respectively if the received DCI is the new NR DCI. If the LTE PHY layer of the NR V2X UE receives the DCI and the fields of the DCI from the NR PHY layer (e.g., intra-UE communication), the LTE PHY may process the DCI in the same way as if the DCI would have been received on LTE Uu (e.g., PDCCH).

In another implementation of the first embodiment, the NR V2X UE may determine based on a cross-RAT flag in the new NR DCI format that a received NR DCI is for an LTE PC5 SL and may translate the received NR DCI format (e.g., fields within the DCI) to an LTE DCI format to be understood by an LTE PHY and/or MAC layer (e.g., DCI format 5A).

Figure 4:
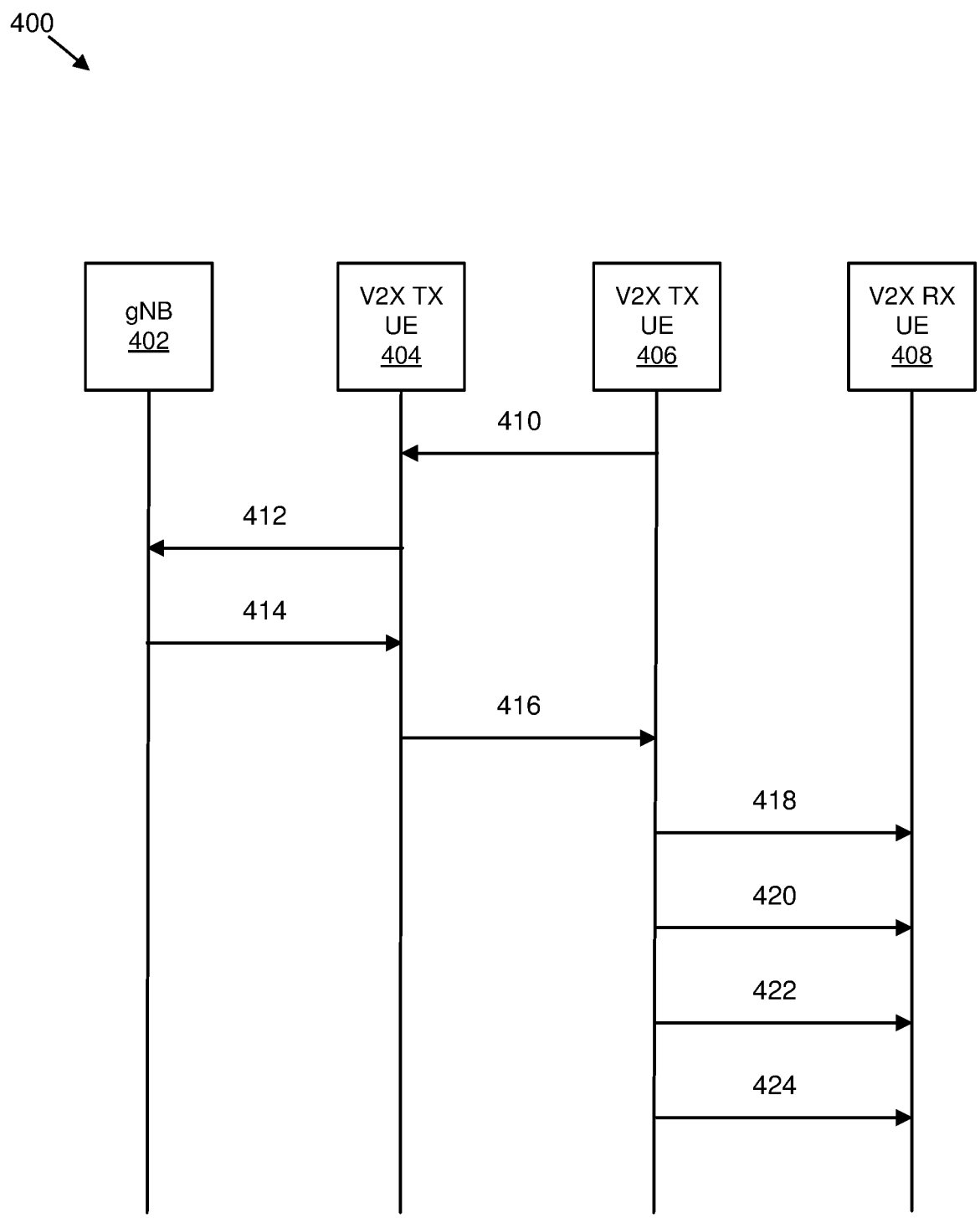
FIG. 4 is a schematic block diagram illustrating one embodiment of communications involving multiple radio access technologies.

FIG. 4 is a schematic block diagram illustrating one embodiment of communications 400 involving multiple radio access technologies. FIG. 4 illustrates one embodiment of signaling flow for configurations (e.g., NR) in which a gNB provides dynamic SL resources for LTE SL UE mode 3 operations. It should be noted that FIG. 4 depicts only one embodiment of dynamic cross-RAT scheduling. The communications 400 include communications transmitted between a gNB 402, a V2X TX UE 404 (NR side), a V2X TX UE 406 (LTE side), and a V2X RX UE 408. Each of the communications 400 described may include one or more messages.

In a first communication 410 transmitted from the V2X TX UE 406 to the V2X TX UE 404, the V2X TX UE 406 transmits an LTE BSR to the V2X TX UE 404. In a second communication 412 transmitted from the V2X TX UE 404 to the gNB 402, the V2X TX UE 404 transmits a SL BSR (e.g., reporting LTE information) to the gNB 402. In the second communication 412, the NR V2X TX UE 404 initiates via an indication to be sent to the gNB 402 over the NR Uu interface a request for SL resources on the LTE PC5 interface. Such a request may, in one embodiment, be signaled by means of a buffer status report indicating the amount of LTE SL data available for transmission (e.g., a new BSR MAC CE format is used to convey LTE buffer status information to the gNB 402). In another embodiment, the gNB 402 may be provided sidelink assistance information (e.g., for SL SPS allocations) via RRC signaling. Moreover, in the second communication 412, the LTE sidelink assistance information message that is reported by the NR V2X UE 404 may be sent to the gNB 402 by encapsulating it in an NR Uu RRC message with an additional bit and/or flag indicating that the assistance message is for LTE PC5 scheduling. Upon reception of the SL request information from the NR V2X UE 404, the gNB 402 may determine a SL resource allocation for the LTE PC5 interface. Such SL resource allocation message may be signaled to the N2 V2X UE 404 in a third communication 414 via an NR DCI on PDCH. The NR DCI conveying SL resource allocation information for the LTE PC5 may be signaled via a new DCI format. In the third communication 414 transmitted from the gNB 402 to the V2X TX UE 404, the gNB 402 transmits a SL grant (e.g., for cross-RAT) to the V2X TX UE 404. Moreover, the SL grant for LTE PC5 may further contain a DCI activating or deactivating an LTE V2X SPS configuration.

In a fourth communication 416 transmitted from the V2X TX UE 404 to the V2X TX UE 406, the V2X TX UE 404 transmits a SL grant (LTE) to the V2X TX UE 406. In other words, upon reception of the NR DCI, the PHY layer of the NR protocol stack of the NR V2X UE 404 delivers the received DCI respectively the fields within the DCI to the LTE PHY of the LTE protocol stack of the V2X TX UE 406. In response to the LTE PHY layer of the V2X TX UE 406 receiving the DCI (e.g., the fields of the DCI) from the NR PHY layer, the LTE PHY may process the DCI the same way as if the LTE DCI was received on the LTE Uu (e.g., PDCCH). In a fifth communication 418 transmitted from the V2X TX UE 406 to the V2X RX UE 408, the V2X TX UE 406 transmits SCI to the V2X RX UE 408. In a sixth communication 420 transmitted from the V2X TX UE 406 to the V2X RX UE 408, the V2X TX UE 406 transmits PSSCH (e.g., a first TB (A) having an RV=0) to the V2X RX UE 408. In a seventh communication 422 transmitted from the V2X TX UE 406 to the V2X RX UE 408, the V2X TX UE 406 transmits PSSCH (e.g., the first TB (A) having an RV=1) to the V2X RX UE 408. In an eighth communication 424 transmitted from the V2X TX UE 406 to the V2X RX UE 408, the V2X TX UE 406 transmits PSSCH (e.g., the first TB (A) having an RV=2) to the V2X RX UE 408.

In a second embodiment, if a DCI on LTE Uu (e.g., eNB) provides SL resources for NR SL UE Mode 1 operations, a new LTE DCI format may be used for LTE Uu containing SL resource allocation information for an NR PC5 interface. In such an embodiment, the new LTE DCI format may include a DCI indicating an activation and/or release of an SL SPS configuration or may assign dynamically SL resources on the NR PC5 interface. In one implementation of the second embodiment, the new LTE DCI format may have the same fields as an NR DCI allocating SL resources. Such an implementation may enable the new LTE DCI to be understood by an NR protocol stack of an NR V2X UE. In another implementation of the second embodiment, the new LTE DCI received on the PDCCH assigning resources for the NR PC5 interface contains an indicator (e.g., a one-bit cross-RAT flag) indicating that information fields contained within the DCI may be applied to the NR PC5 interface. In certain embodiments, a new RNTI may be used to indicate that DCI conveys SL resource allocation information for another RAT. In various implementations of the second embodiment, a PHY layer of an LTE protocol stack of an NR V2X UE delivers the received LTE DCI to an NR PHY of an NR protocol stack if a flag within received DCI indicates that the DCI assigns SL resources for the NR PC5 or if the received DCI is the new LTE DCI. In some embodiments, if the NR PHY layer of the NR V2X UE receives the DCI (e.g., the fields of the DCI) from the LTE PHY layer (e.g., intra-UE communication), the NR PHY may process the DCI as in an NR protocol (e.g., the same as if the DCI would have been received on the NR Uu (e.g., PDCCH)).

Figure 5:
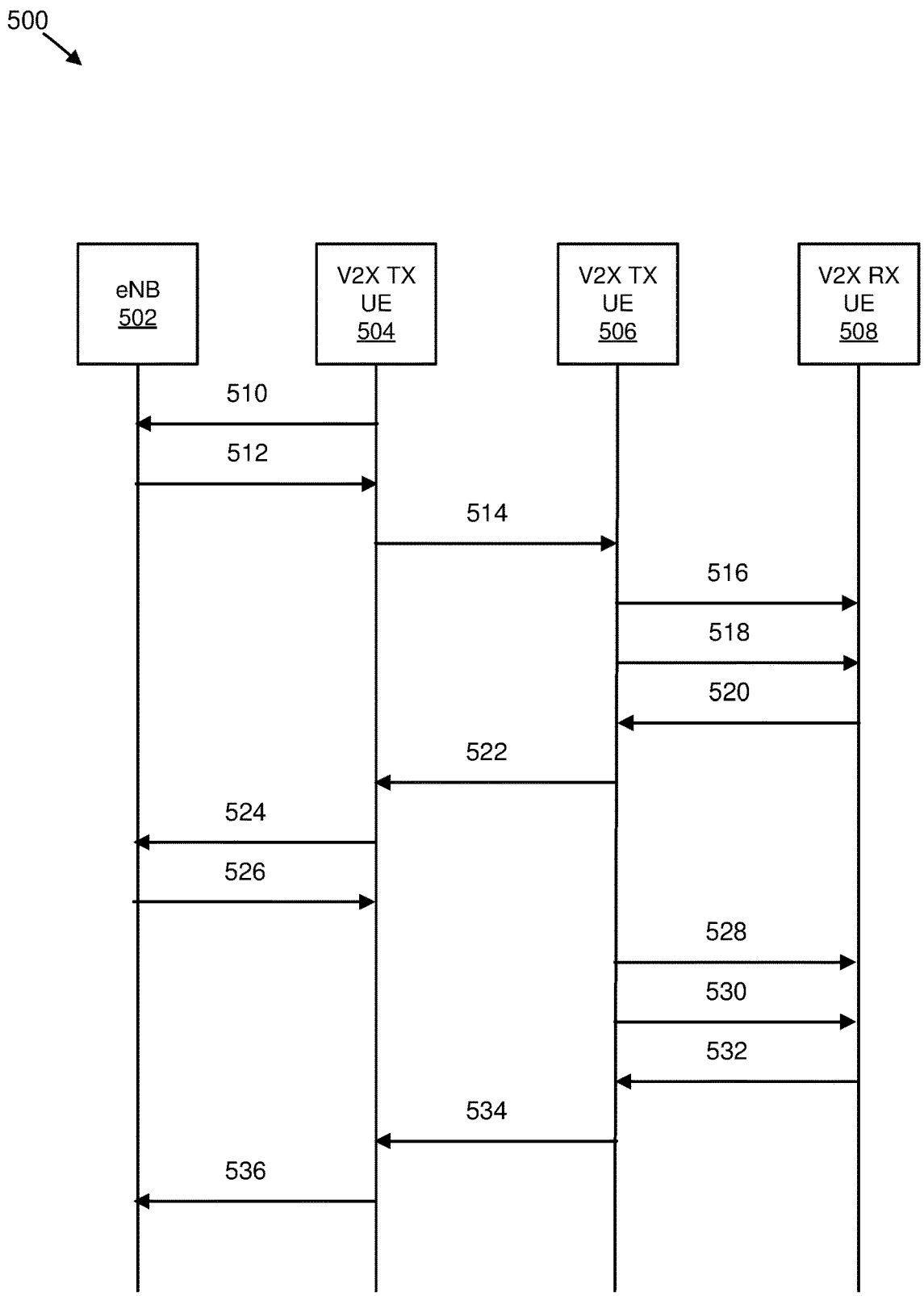
FIG. 5 is a schematic block diagram illustrating another embodiment of communications involving multiple radio access technologies.

FIG. 5 is a schematic block diagram illustrating another embodiment of communications 500 involving multiple radio access technologies. In FIG. 5, the communications 500 involve an eNB (e.g., LTE) providing SL resources for NR SL UE Mode 1 operations. The communications 500 include communications transmitted between an eNB 502, a V2X TX UE 504 (LTE side), a V2X TX UE 506 (NR side), and a V2X RX UE 508. Each of the communications 500 described may include one or more messages.

In a first communication 510 transmitted from the V2X TX UE 504 to eNB 502, the V2X TX UE 504 transmits a SL BSR (e.g., a request for SL resources on the NR PC5 interface over the LTE Uu interface) to the eNB 502. The SL BSR (e.g., request) may be signaled by a buffer status report indicating the amount of NR SL data available for transmission (e.g., new LTE BSR MAC CE format used to convey NR BS information to the eNB 502). In some embodiments, the first communication 510 may provide the eNB 502 NR sidelink assistance information (e.g., for SL SPS allocations) via RRC signaling. The NR sidelink assistance information message that is reported by the V2X TX UE 504 may be sent to the eNB 502 by encapsulating it in an LTE RRC message with an additional bit and/or flag indicating that the assistance message is for NR PC5 scheduling.

In a second communication 512 transmitted from the eNB 502 to the V2X TX UE 504, the eNB 502 transmits a SL grant (e.g., HARQ process ID=X, NDI=1, LTE PUCCH ACK/NACK resource) to the V2X TX UE 504. In one embodiment of the second communication 512, in response to the reception of the scheduling request from the V2X TX UE 504, the eNB 502 sends a DCI (e.g., on the PDCCH) containing NR SL resource allocation information to the V2X TX UE 504. In certain embodiments, the DCI assigns resources and/or timing information for a feedback message on the LTE Uu interface to indicate whether the SL transmission on NR PC5 was successfully received or whether resources for a retransmission on NR PC5 are required. Such feedback may be transmitted in the form of an ACK/NACK on the PUCCH.

In a third communication 514 transmitted from the V2X TX UE 504 to the V2X TX UE 506, the V2X TX UE 504 transmits a SL grant (NR) (e.g., HARQ process ID=X, NDI=1) to the V2X TX UE 506. In some embodiments, upon reception of the LTE DCI on PDCCH at the LTE protocol stack, the V2X TX UE 504 delivers the NR SL grant (e.g., information) to the V2X TX UE (NR protocol stack) 506 which then further executes the NR SL grant. It should be noted that the eNB 502 may allocate via the V2X TX UE 506 the SL feedback resources to the V2X RX UE 508. This may be done at the setup of a SLRB.

In a fourth communication 516 transmitted from the V2X TX UE 506 to the V2X RX UE 508, the V2X TX UE 506 transmits SCI (e.g., HARQ process ID=Y, NDI=1) to the V2X RX UE 508. In a fifth communication 518 transmitted from the V2X TX UE 506 to the V2X RX UE 508, the V2X TX UE 506 transmits PSSCH (e.g., a first TB (A) having an RV=0) to the V2X RX UE 508. In a sixth communication 520 transmitted from the V2X RX UE 508 to the V2X TX UE 506, the V2X RX UE 508 transmits NACK for TB A to the V2X TX UE 506. In a seventh communication 522 transmitted from the V2X TX UE 506 to the V2X TX UE 504, the V2X TX UE 506 transmits NACK for TB A to the V2X TX UE 504. In an eighth communication 524 transmitted from the V2X TX UE 504 to the eNB 502, the V2X TX UE 504 transmits NACK for SL grant to the eNB 502.

In a ninth communication 526 transmitted from the eNB 502 to the V2X TX UE 504, the eNB 502 transmits a SL grant (e.g., HARQ process ID=X, NDI=1, LTE PUCCH ACK/NACK resource) to the V2X TX UE 504. In a tenth communication 528 transmitted from the V2X TX UE 506 to the V2X RX UE 508, the V2X TX UE 506 transmits SCI (e.g., HARQ process ID=Y, NDI=1) to the V2X RX UE 508. In an eleventh communication 530 transmitted from the V2X TX UE 506 to the V2X RX UE 508, the V2X TX UE 506 transmits PSSCH (e.g., a first TB (A) having an RV=1) to the V2X RX UE 508. In a twelfth communication 532 transmitted from the V2X RX UE 508 to the V2X TX UE 506, the V2X RX UE 508 transmits ACK for TB A to the V2X TX UE 506. In a thirteenth communication 534 transmitted from the V2X TX UE 506 to the V2X TX UE 504, the V2X TX UE 506 transmits ACK for TB A to the V2X TX UE 504. In a fourteenth communication 536 transmitted from the V2X TX UE 504 to the eNB 502, the V2X TX UE 504 transmits ACK for SL grant to the eNB 502.

In various embodiments, because the timing (e.g., slot and/or frame boundaries) of an NR cell and an LTE cell and/or carrier may differ significantly (e.g., asynchronous network operation), and the LTE may operate on a TTI level (e.g., having potentially a different SCS compared to the NR cell and/or BWP) and the NR PHY may operate on a slot-level or OFM-symbol level, the DCI received on one RAT may be delivered to the other RAT at some predefined timing (e.g., some timing translation from one RAT to the other may be performed). As may be appreciated, even though the following description may apply to an LTE PC5 SL resource allocation done via a NR DCI, the aspects described may be equally applicable if an NR SL PC5 allocation is signaled via an LTE DCI.

Figure 6:
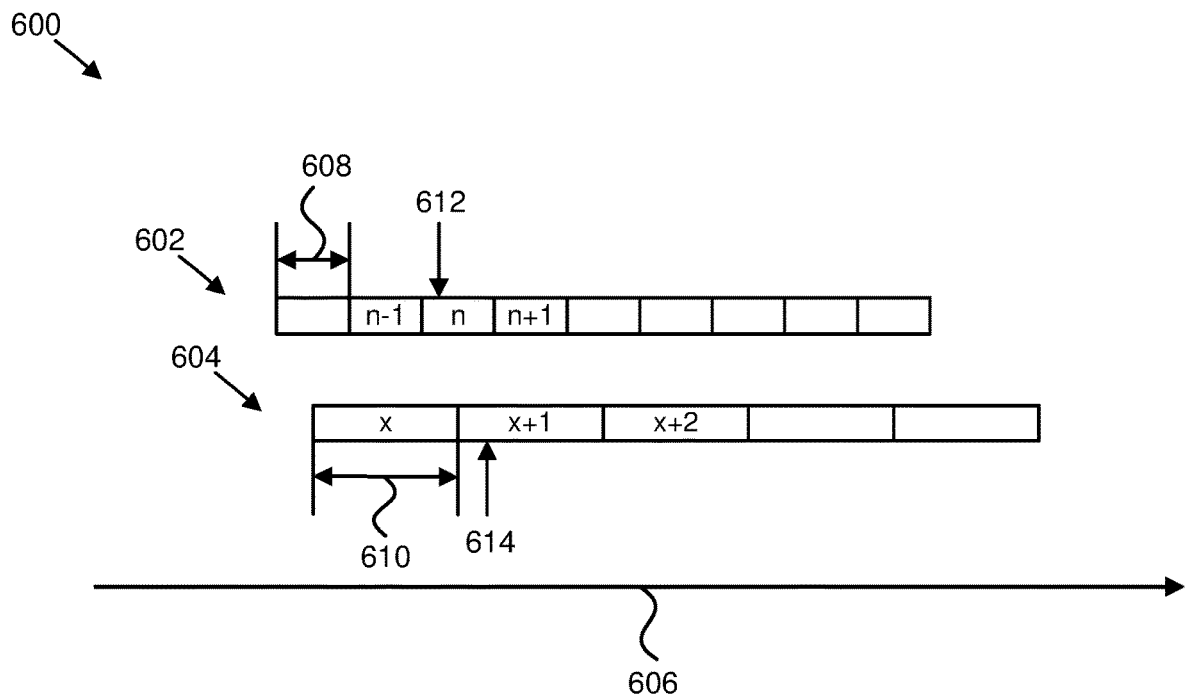
FIG. 6 is a schematic block diagram illustrating one embodiment of timing for multiple radio access technology communications.
Figure 7:
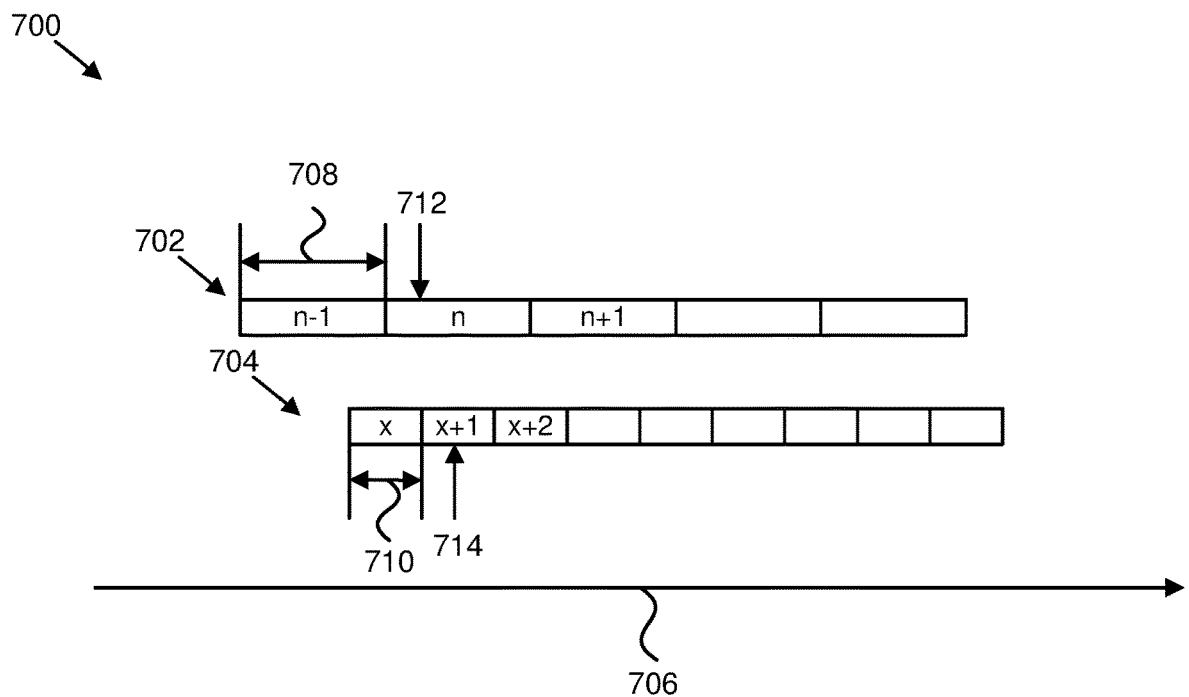
FIG. 7 is a schematic block diagram illustrating another embodiment of timing for multiple radio access technology communications.

In some embodiments, DCI information received on an NR PDCCH may be delivered to an LTE PHY layer of an NR V2X UE at some predefined timing. In various embodiments, an NR PHY may deliver a received DCI to an LTE PHY at some predefined timing. In other embodiments, the LTE PHY may consider the DCI allocating SL resources to have been received in a predefined TTI/subframe. Such timing offset may be fixed in a standard (e.g., if an NR DCI containing a LTE SL grant was received in slot n, the UE may consider the LTE SL grant as being received in a first LTE subframe x which starts at least $T_{offset}$ later then slot n) or it may be preconfigured by higher layer signaling. The timing offset could be defined in terms of ms or in number of slots/subframe/symbols. In some embodiments, a DCI may contain some information indicating the LTE subframe (s) in which the SL resources (e.g., resources for PSCCH/PSSCH) are allocated. It should be noted that the timing of the DCI may be important for an efficient scheduling of resources among multiple UEs. In certain embodiments, a reception timing of DCI may affects a starting instance of a timer in a MAC layer of a UE (e.g., DRX related timer). FIGS. 6 and 7 illustrate various timing relationships between reception of an NR DCI on a Uu interface and timing of execution of a grant on an LTE part of a V2X UE. In FIG. 6, an NR DCI containing an LTE SL grant is received in slot n. According to FIG. 6, a UE (e.g., LTE protocol stack of the TX UE) behaves as a LTE SL grant was received in TTI x+1 on the PDCCH (e.g., NR PHY of the UE delivers the received SL grant to the LTE PHY at TTI x+1). It should be noted that there may be a different timing relation between the NR SL DCI (e.g., containing an LTE SL DCI) reception and a corresponding LTE SL DCI reception/execution defined as shown in FIG. 7.

FIG. 6 is a schematic block diagram illustrating one embodiment of timing 600 for multiple radio access technology communications. The timing 600 illustrates NR information 602 and LTE information 604 over a time 606. A slot size 608 of the NR information 602 may be 0.5 ms, and a subframe/TTI size 610 of the LTE information 604 may be 1 ms. At a time 612, an NR DCI (LTE SL grant) is received on the NR Uu interface, and at a time 614 the UE considers the LTE SL grant contained within the NR DCI as being received (on the LTE Uu interface) and processes the SL grant accordingly.

FIG. 7 is a schematic block diagram illustrating another embodiment of timing 700 for multiple radio access technology communications. The timing 700 illustrates NR information 702 and LTE information 704 over a time 706. A slot size 708 of the NR information 702 may be 1.0 ms, and a sTTI size 710 of the LTE information 704 may be 0.5 ms. At a time 712, an NR DCI (LTE SL grant) is received, and at a time 714 the UE considers the LTE SL grant contained within the NR DCI as being received (on the LTE Uu interface) and processes the SL grant accordingly.

In various embodiments, a timing relation may be deterministic and known by a UE and a gNB and may be the same across all UEs being scheduled by a different RAT. In one embodiment, an NR SL DCI allocating SL resources on an LTE PC5 interface contains some timing information indicating a time at which a SL grant may be executed by a NR V2X UE. Such timing information may indicate a subframe number in which an LTE SL grant may be executed (e.g. the UE behaves as if the LTE SL grant was received in an indicated subframe on the PDCCH).

Figure 8:
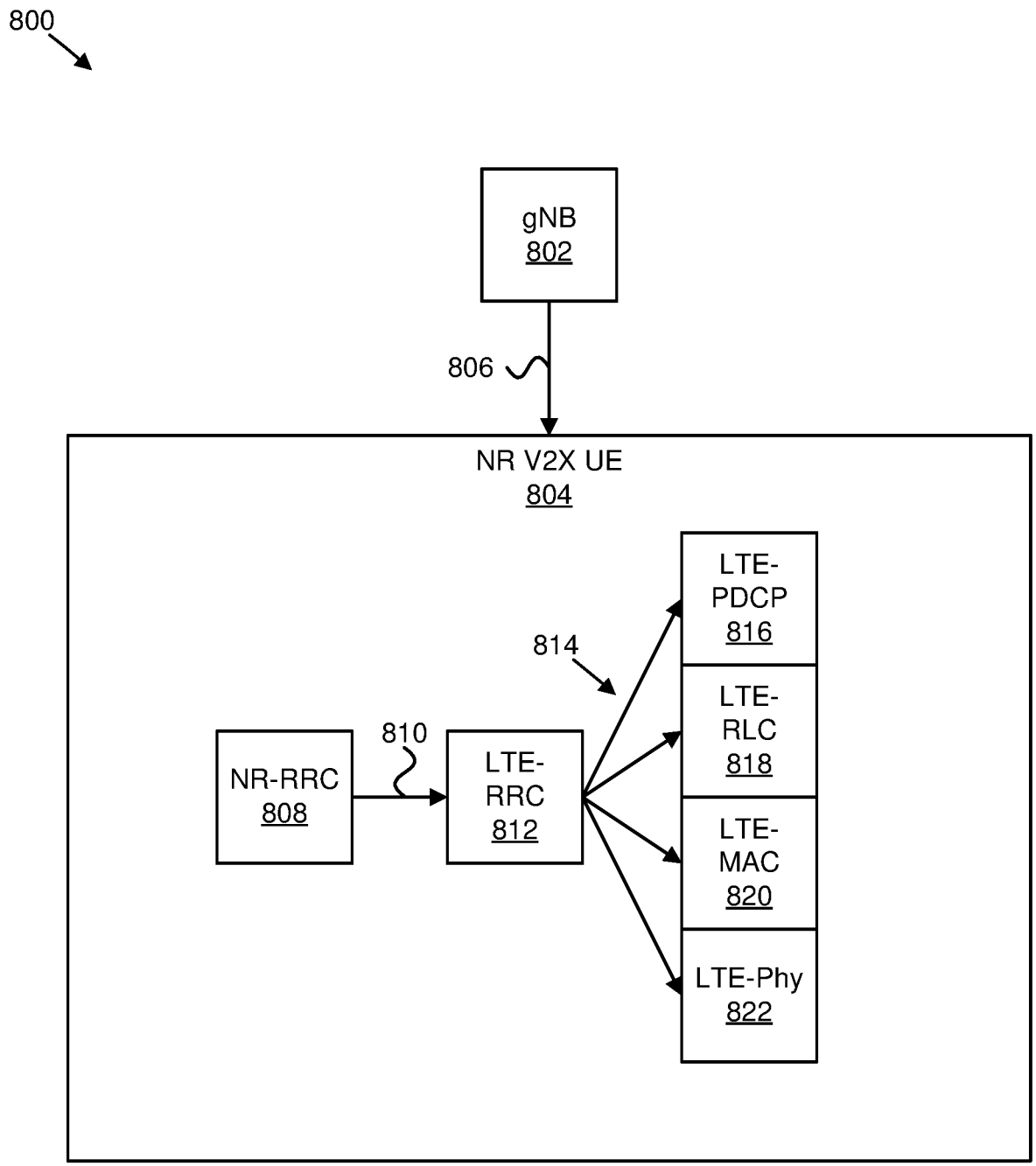
FIG. 8 is a schematic block diagram illustrating one embodiment of a system configuring multiple radio access technologies.

FIG. 8 is a schematic block diagram illustrating one embodiment of a system 800 configuring multiple radio access technologies. The system 800 includes a gNB 802 and an NR V2X UE 804. FIG. 8 illustrates how the gNB 802 provides LTE PC5 V2X communication resources to the NR V2X UE 804. The gNB 802 transmits 806 RRC signaling (or broadcast signaling) containing LTE PC5 resources. The NR V2X UE 804 uses either C-RNTI (e.g., for dedicated RRC signaling) or SI-RNTI (e.g., for broadcast signaling) to receive the LTE PC5 resources. An NR-RRC 808 of the NR V2X UE 804 receives the RRC signaling (or broadcast signaling) containing the LTE PC5 resources. The NR-RRC 808 transmits 810 a BITSTRING (e.g., containing the RRC signaling for LTE PC5 resources) to an LTE-RRC 812 of the NR V2X UE 804. As may be appreciated, both NR-RRC 808 and LTE-RRC 812 may be implemented together (e.g., the illustrated separation may be logical). The LTE-RRC 812 may interpret the BITSTRING (e.g., configuration), check for consistency (e.g., if the configuration is valid), and configures lower layers. The LTE PC5 communication resources may then be configured to the physical layer. Specifically, the LTE-RRC 812 transmits configuration information 814 to an LTE-PDCP 816, an LTE-RLC 818, an LTE-MAC 820, and an LTE-Phy 822.

Figure 9:
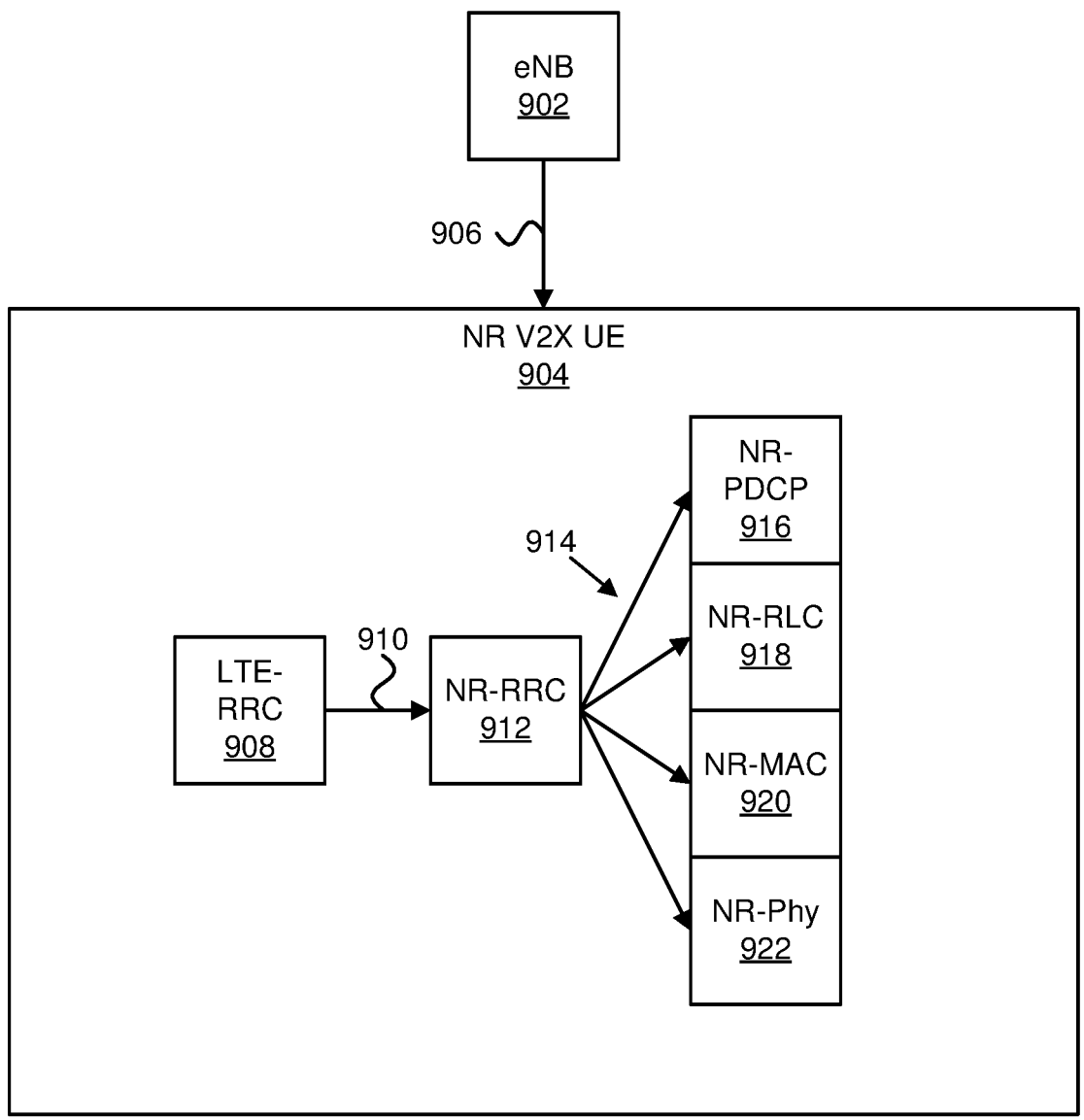
FIG. 9 is a schematic block diagram illustrating another embodiment of a system configuring multiple radio access technologies.

FIG. 9 is a schematic block diagram illustrating another embodiment of a system 900 configuring multiple radio access technologies. The system 900 includes an eNB 902 and an NR V2X UE 904. FIG. 9 illustrates cross-RAT communication in which the eNB 902 provides resources for NR PC5 communication to the NR V2X UE 904. The eNB 902 transmits 906 RRC signaling (or broadcast signaling) containing LTE PC5 resources. An LTE-RRC 908 of the NR V2X UE 904 receives the RRC signaling (or broadcast signaling) containing the LTE PC5 resources. The LTE-RRC 908 transmits 910 a BITSTRING to an NR-RRC 912 of the NR V2X UE 904. The NR-RRC 912 transmits configuration information 914 to an NR-PDCP 916, an NR-RLC 918, an NR-MAC 920, and an NR-Phy 922.

In certain embodiments, NR V2X UEs may be informed by a paging message that system information for cross-RAT PC5 resources has changed and the updated system information for cross-RAT PC5 resources may be acquired immediately. In various embodiments, a modification period of two RATs are aligned so that an actual change of system information for cross-RAT PC5 resources happen at the same time.

In some embodiments, a V2X RX UE may reject a V2X communication with a V2X TX UE if there are no available HARQ processes for SL in the V2X RX UE. In such an embodiment, the V2X RX UE may send a reject message (e.g., via PC5 RRC) indicating that it doesn't have sufficient resources for V2X communication. The reject message may be sent in response to reception of an RRC PC5 establishment message from the V2X TX UE. The RRC PC5 establishment message may be used to setup a unicast connection between the V2X TX UE and the V2X RX UE and may assign SL resource for HARQ feedback sent from the V2X RX UE.

Figure 10:
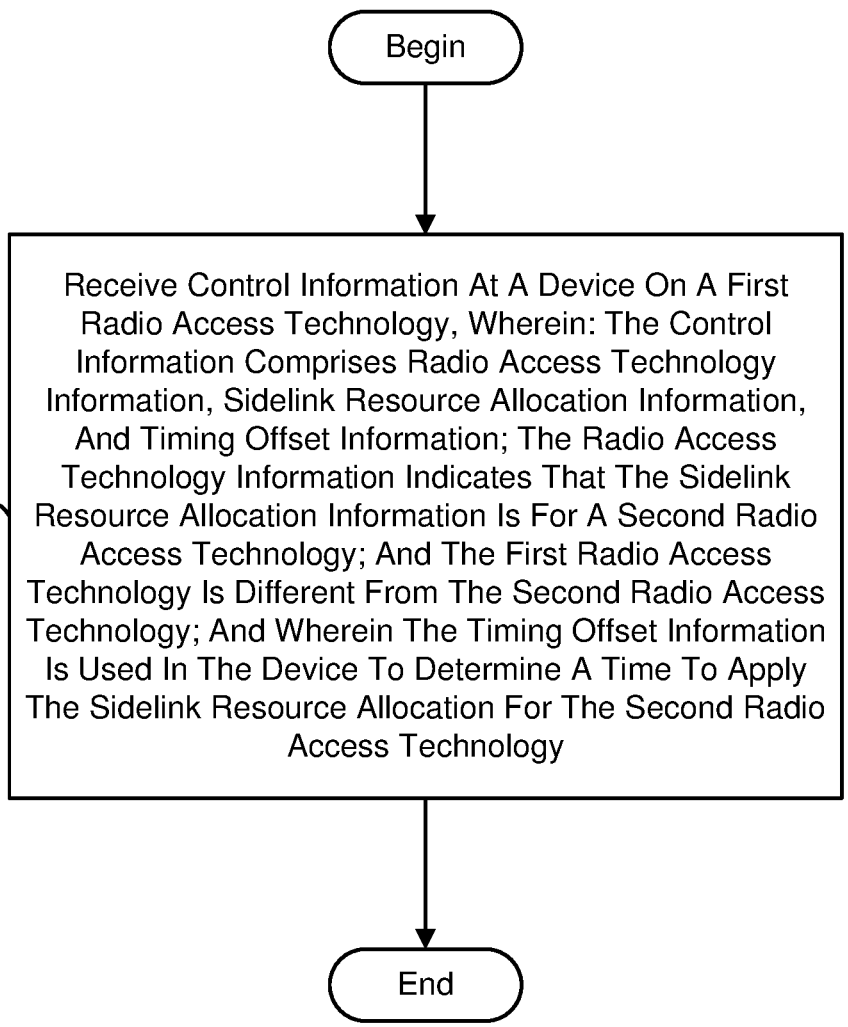
FIG. 10 is a flow chart diagram illustrating one embodiment of a method for multiple radio access technology communications.

FIG. 10 is a flow chart diagram illustrating one embodiment of a method 1000 for multiple radio access technology communications. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002 control information at a device on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used in the device to determine a time to apply the sidelink resource allocation for the second radio access technology.

In various embodiments, the sidelink resource allocation information and timing offset information are part of downlink control information. In some embodiments, the radio access technology information comprises a radio network temporary identifier that indicates that the sidelink resource allocation information is for the second radio access technology. In certain embodiments, the control information comprises a downlink control information format.

In one embodiment, the downlink control information format comprises a flag that indicates that the sidelink resource allocation information is for the second radio access technology. In various embodiments, use of the downlink control information format indicates that the sidelink resource allocation information is for the second radio access technology. In some embodiments, the sidelink resource allocation information activates a sidelink semi persistent scheduling configuration, releases a sidelink semi persistent scheduling configuration, dynamically assigns sidelink resources, or some combination thereof.

In certain embodiments, the first radio access technology is a new radio interface and the second radio access technology is a long term evolution interface. In one embodiment, the first radio access technology is a long term evolution interface and the second radio access technology is a new radio interface. In various embodiments, the timing offset information comprises a time, a number of slots, a number of subframes, a number of symbols, or some combination thereof.

Figure 11:
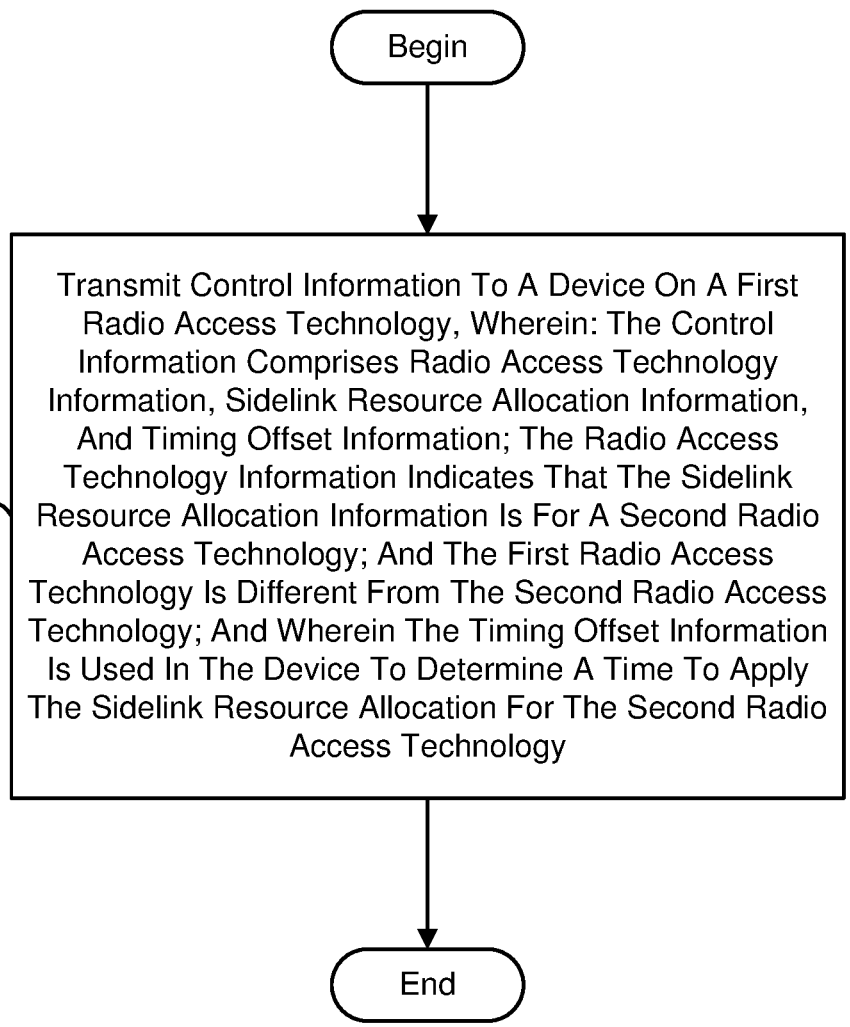
FIG. 11 is a flow chart diagram illustrating another embodiment of a method for multiple radio access technology communications.

FIG. 11 is a flow chart diagram illustrating another embodiment of a method 1100 for multiple radio access technology communications. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes transmitting 1102 control information to a device on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used in the device to determine a time to apply the sidelink resource allocation for the second radio access technology.

In various embodiments, the sidelink resource allocation information and the timing offset information are part of downlink control information. In some embodiments, the radio access technology information comprises a radio network temporary identifier that indicates that the sidelink resource allocation information is for the second radio access technology. In certain embodiments, the control information comprises a downlink control information format.

In one embodiment, the downlink control information format comprises a flag that indicates that the sidelink resource allocation information is for the second radio access technology. In various embodiments, use of the downlink control information format indicates that the sidelink resource allocation information is for the second radio access technology. In some embodiments, the sidelink resource allocation information activates a sidelink semi persistent scheduling configuration, releases a sidelink semi persistent scheduling configuration, dynamically assigns sidelink resources, or some combination thereof.

In certain embodiments, the first radio access technology is a new radio interface and the second radio access technology is a long term evolution interface. In one embodiment, the first radio access technology is a long term evolution interface and the second radio access technology is a new radio interface. In various embodiments, the timing offset information comprises a time, a number of slots, a number of subframes, a number of symbols, or some combination thereof.

In one embodiment, a method comprises: receiving control information at a device on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used in the device to determine a time to apply the sidelink resource allocation for the second radio access technology.

In various embodiments, the sidelink resource allocation information and timing offset information are part of downlink control information.

In some embodiments, the radio access technology information comprises a radio network temporary identifier that indicates that the sidelink resource allocation information is for the second radio access technology.

In certain embodiments, the control information comprises a downlink control information format.

In one embodiment, the downlink control information format comprises a flag that indicates that the sidelink resource allocation information is for the second radio access technology.

In various embodiments, use of the downlink control information format indicates that the sidelink resource allocation information is for the second radio access technology.

In some embodiments, the sidelink resource allocation information activates a sidelink semi persistent scheduling configuration, releases a sidelink semi persistent scheduling configuration, dynamically assigns sidelink resources, or some combination thereof.

In certain embodiments, the first radio access technology is a new radio interface and the second radio access technology is a long term evolution interface.

In one embodiment, the first radio access technology is a long term evolution interface and the second radio access technology is a new radio interface.

In various embodiments, the timing offset information comprises a time, a number of slots, a number of subframes, a number of symbols, or some combination thereof.

In one embodiment, an apparatus comprises: a receiver that receives control information on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used to determine a time to apply the sidelink resource allocation for the second radio access technology.

In various embodiments, the sidelink resource allocation information and timing offset information are part of downlink control information.

In some embodiments, the radio access technology information comprises a radio network temporary identifier that indicates that the sidelink resource allocation information is for the second radio access technology.

In certain embodiments, the control information comprises a downlink control information format.

In one embodiment, the downlink control information format comprises a flag that indicates that the sidelink resource allocation information is for the second radio access technology.

In various embodiments, use of the downlink control information format indicates that the sidelink resource allocation information is for the second radio access technology.

In some embodiments, the sidelink resource allocation information activates a sidelink semi persistent scheduling configuration, releases a sidelink semi persistent scheduling configuration, dynamically assigns sidelink resources, or some combination thereof.

In certain embodiments, the first radio access technology is a new radio interface and the second radio access technology is a long term evolution interface.

In one embodiment, the first radio access technology is a long term evolution interface and the second radio access technology is a new radio interface.

In various embodiments, the timing offset information comprises a time, a number of slots, a number of subframes, a number of symbols, or some combination thereof.

In one embodiment, a method comprises: transmitting control information to a device on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used in the device to determine a time to apply the sidelink resource allocation for the second radio access technology.

In various embodiments, the sidelink resource allocation information and the timing offset information are part of downlink control information.

In some embodiments, the radio access technology information comprises a radio network temporary identifier that indicates that the sidelink resource allocation information is for the second radio access technology.

In certain embodiments, the control information comprises a downlink control information format.

In one embodiment, the downlink control information format comprises a flag that indicates that the sidelink resource allocation information is for the second radio access technology.

In various embodiments, use of the downlink control information format indicates that the sidelink resource allocation information is for the second radio access technology.

In some embodiments, the sidelink resource allocation information activates a sidelink semi persistent scheduling configuration, releases a sidelink semi persistent scheduling configuration, dynamically assigns sidelink resources, or some combination thereof.

In certain embodiments, the first radio access technology is a new radio interface and the second radio access technology is a long term evolution interface.

In one embodiment, the first radio access technology is a long term evolution interface and the second radio access technology is a new radio interface.

In various embodiments, the timing offset information comprises a time, a number of slots, a number of subframes, a number of symbols, or some combination thereof.

In one embodiment, an apparatus comprises: a transmitter that transmits control information to a device on a first radio access technology, wherein: the control information comprises radio access technology information, sidelink resource allocation information, and timing offset information; the radio access technology information indicates that the sidelink resource allocation information is for a second radio access technology; and the first radio access technology is different from the second radio access technology; and wherein the timing offset information is used in the device to determine a time to apply the sidelink resource allocation for the second radio access technology.

In various embodiments, the sidelink resource allocation information and the timing offset information are part of downlink control information.

In some embodiments, the radio access technology information comprises a radio network temporary identifier that indicates that the sidelink resource allocation information is for the second radio access technology.

In certain embodiments, the control information comprises a downlink control information format.

In one embodiment, the downlink control information format comprises a flag that indicates that the sidelink resource allocation information is for the second radio access technology.

In various embodiments, use of the downlink control information format indicates that the sidelink resource allocation information is for the second radio access technology.

In some embodiments, the sidelink resource allocation information activates a sidelink semi persistent scheduling configuration, releases a sidelink semi persistent scheduling configuration, dynamically assigns sidelink resources, or some combination thereof.

In certain embodiments, the first radio access technology is a new radio interface and the second radio access technology is a long term evolution interface.

In one embodiment, the first radio access technology is a long term evolution interface and the second radio access technology is a new radio interface.

In various embodiments, the timing offset information comprises a time, a number of slots, a number of subframes, a number of symbols, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for wireless communication, the apparatus comprising:
a processor; and
a memory coupled to the processor, the processor configured to cause the apparatus to:
receive a downlink control information (DCI) using a first radio access technology (RAT) at a first time,
wherein the DCI comprises a DCI format, the DCI format is associated with a radio network temporary identifier (RNTI), and
wherein the DCI comprises a first field indicating a sidelink (SL) resource allocation information for a second RAT, and a second field indicating timing offset information; and
apply the SL resource allocation information for the second RAT at a second time according to the timing offset information, wherein the second time is greater than or equal to an offset time plus the first time.

2. The apparatus of claim 1, wherein the processor is further configured to cause the apparatus to determine the second time based on the timing offset information, wherein applying the SL resource allocation information for the second RAT at the second time is based on the determining.

3. The apparatus of claim 1, wherein the offset time is determined based at least on the timing offset information.

4. The apparatus of claim 1, wherein the SL resource allocation information activates a SL semi persistent scheduling (SPS) configuration, releases a SL SPS configuration, dynamically assigns SL resources, or a combination thereof.

5. The apparatus of claim 1, wherein the DCI format comprises a field indicating a sidelink SPS configuration index referring to a SL SPS configuration being configured by radio resource control (RRC) signaling.

6. The apparatus of claim 1, wherein the first RAT is a new radio interface and the second RAT is a long term evolution interface.

7. The apparatus of claim 1, wherein the timing offset information comprises a time, a number of slots, a number of subframes, a number of symbols, or a combination thereof.

8. A method comprising:
receiving a downlink control information (DCI) using a first radio access technology (RAT) at a first time,
wherein the DCI comprises a DCI format, the DCI format is associated with a radio network temporary identifier (RNTI), and
wherein the DCI comprises a first field indicating a sidelink (SL) resource allocation information for a second RAT and a second field indicating timing offset information; and
applying the SL resource allocation information for the second RAT at a second time according to the timing offset information, wherein the second time is greater than or equal to an offset time plus the first time.

9. The method of claim 8, further comprising:
determining the second time based on the timing offset information,
wherein applying the SL resource allocation information for the second RAT at the second time is based on the determining.

10. The method of claim 8, wherein the offset time is determined based at least on the timing offset information.

11. The method of claim 8, wherein the SL resource allocation information activates a SL semi persistent scheduling (SPS) configuration, releases a SL SPS configuration, dynamically assigns SL resources, or a combination thereof.

12. The method of claim 8, wherein the DCI format comprises a field indicating a sidelink SPS configuration index referring to a SL SPS configuration being configured by radio resource control (RRC) signaling.

13. The method of claim 8, wherein the first RAT is a new radio interface and the second RAT is a long term evolution interface.

14. The method of claim 8, wherein the timing offset information comprises a time, a number of slots, a number of subframes, a number of symbols, or a combination thereof.

15. An apparatus for wireless communication, the apparatus comprising:
a processor; and
a memory coupled to the processor, the processor configured to cause the apparatus to:
transmit a downlink control information (DCI) using a first radio access technology (RAT) at a first time,
wherein the DCI comprises a DCI format, the DCI format is associated with a radio network temporary identifier (RNTI),
wherein the DCI comprises a first field indicating a sidelink (SL) resource allocation information for a second RAT and a second field indicating timing offset information; and
wherein the SL resource allocation information is applied for the second RAT at a second time according to the timing offset information, and the second time is greater than or equal to an offset time plus the first time.

16. The apparatus of claim 15, wherein the offset time is determined based at least on the timing offset information.

17. The apparatus of claim 15, wherein the SL resource allocation information activates a SL semi persistent scheduling (SPS) configuration, releases a SL SPS configuration, dynamically assigns SL resources, or a combination thereof.

18. The apparatus of claim 15, wherein the DCI format comprises a field indicating a sidelink SPS configuration index referring to a SL SPS configuration being configured by radio resource control (RRC) signaling.

19. The apparatus of claim 15, wherein the first RAT is a new radio interface and the second RAT is a long term evolution interface.

20. The apparatus of claim 15, wherein the timing offset information comprises a time, a number of slots, a number of subframes, a number of symbols, or a combination thereof.

* * * * *